(No Model.)

J. STRICKLER.
CAPSULE MACHINE.

No. 307,236.

Patented Oct. 28, 1884.

WITNESSES:
Theo. G. Hoster
C. Sedgwick

INVENTOR:
J. Strickler
BY Munn & Co.
ATTORNEYS.

UNITED STATES PATENT OFFICE.

JACOB STRICKLER, OF POUGHKEEPSIE, NEW YORK.

CAPSULE-MACHINE.

SPECIFICATION forming part of Letters Patent No. 307,236, dated October 28, 1884.

Application filed May 24, 1884. (No model.)

*To all whom it may concern:*

Be it known that I, JACOB STRICKLER, of Poughkeepsie, Dutchess county, New York, have invented a new and useful Improvement in Capsule-Fillers, of which the following is a full, clear, and exact description.

My invention relates to plunger devices designed to be operated by hand for filling gelatine capsules with quinine or other dry medicinal powders; and it consists in a capsule-filler of novel construction, by which not only is the filling effectually and expeditiously done without injury to the capsule, but in which the plunger is arranged to pass directly under the hopper and made to carry the powder before it into the capsules, whereby clogging, as when the plunger passes through the hopper into the capsule, is avoided.

Reference is to be had to the accompanying drawings, forming part of this specification, in which similar letters of reference indicate corresponding parts in both figures.

Figure 1:
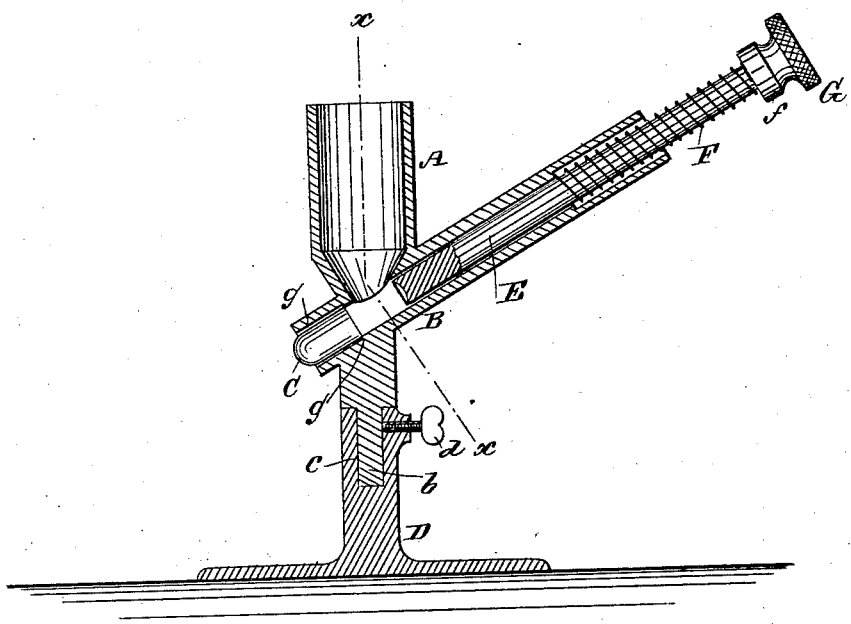
Figure 2:
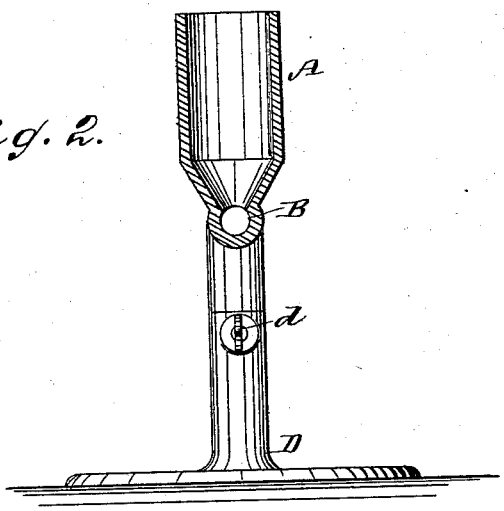

Figure 1 represents a vertical longitudinal section of a capsule-filler embodying my invention, and Fig. 2 is a transverse vertical section thereof on the irregular line $x\ x$ in Fig. 1.

A indicates a receptacle or hopper in which the dry powder for filling the capsules is put, and from which said powder passes by a lower orifice into a filling-tube, B, arranged transversely below the hopper, and which is represented as inclined to the horizon to facilitate the fall of the powder toward the delivery end of the tube in which the capsule C is inserted.

D is the pedestal on which the filler stands, or on which it is removably carried by a shank, $b$, and socket $c$, and secured by a set-screw, $d$, to provide for changing the fillers, having different-sized filling-tubes to suit capsules of different dimensions.

E is the plunger, arranged to work within the filling-tube B from its back end, and having combined with it a spiral spring, F, which serves to work or throw the plunger back.

G is a button on the back end of the plunger for forcing the plunger forward, and which has a collar, $f$, that, striking the back end of the tube, arrests the extreme forward movement of the plunger when discharging the filled capsule. The delivery end of the tube, in which the capsule to be filled is placed, is made somewhat larger than the contiguous or remaining portion of the tube, so as to form an inwardly-shouldered recess or chamber, $g$, for the capsules. The shoulder of said recess, against which the mouth end of the capsule rests, should be slightly deeper than the walls of the capsule to prevent the plunger from striking the side of the capsule, and also, when moving back, from carrying the capsule along with it.

To fill the capsule, place it in the chamber $g$ and hold it in place by applying the index-finger of the one hand, which acts as a cushion, to the closed protruding back end of the capsule, and the powder having been placed in the hopper A, press down with the thumb of the other hand on the button G of the plunger. This will force the powder in the track of the plunger E into the capsule. The pressure of the thumb is then removed from the button on the plunger and the spring F allowed to force the plunger back, when a fresh charge of powder falls from the hopper in front of the plunger, that is again pressed forward to continue the filling of the capsule. This operation is repeated any number of times till the capsule is sufficiently filled. The forward end of the plunger is made slightly concave for the purpose of leaving a convex surface on the powder at the mouth end of the capsule to fit the cap when put on the filled capsules. After the capsule has been fully charged with powder by the plunger of the filler, which can be readily ascertained by the operator's observing the distance the collar of the button on the back end of the plunger is from the rear end of the filling-tube as the plunger is pressed down firmly on the powder, and comparing such distance with the length of the capsule, the finger is then removed from the outer closed end of the capsule and the plunger pressed down or inward to its full extent. This expels the filled capsule ready to be capped. The return spring action of the filler gives it an easy and quick filling action, and the supply of the powder is automatic, while by arranging the plunger to pass beneath the powder receptacle or hopper instead of through it there is no liability of the powder to clog in the neck of the hopper or funnel.

Having thus described my invention, I claim as new and desire to secure by Letters Patent—

1. In a capsule-filler, the combination, with the hopper or receptacle used to contain the powder for filling the capsules, of the filling-tube and its plunger arranged beneath and transversely to the discharge-orifice of said hopper or receptacle, substantially as specified.

2. In a capsule-filler, the combination of the powder hopper or receptacle A, the filling-tube B, arranged transversely and beneath said receptacle, and the filling-plunger E, with its return-spring F, essentially as described.

3. In a capsule-filler, the combination of the powder hopper or receptacle A, the filling-tube B, arranged transversely and beneath said receptacle, and constructed at its delivery end with an enlarged internally-shouldered capsule-holding recess or chamber, $g$, and the filling plunger E, with its return-spring F, substantially as specified.

JACOB STRICKLER.

Witnesses:
HENRY A. BOURNE,
DAVID B. WARD.